US010011369B2

(12) United States Patent
Baudson et al.

(10) Patent No.: US 10,011,369 B2
(45) Date of Patent: Jul. 3, 2018

(54) AIRCRAFT VISION SYSTEM WITH RELIEF LINES AND ASSOCIATED METHOD

(71) Applicant: DASSAULT AVIATION, Paris (FR)

(72) Inventors: Olivier Baudson, Paris (FR); Arnaud Turpin, Boulogne (FR)

(73) Assignee: DASSAULT AVIATION, Paris (FR)

( * ) Notice: Subject to any disclaimer, the term of this patent is extended or adjusted under 35 U.S.C. 154(b) by 352 days.

(21) Appl. No.: 14/044,245

(22) Filed: Oct. 2, 2013

(65) Prior Publication Data

US 2014/0100721 A1 Apr. 10, 2014

(30) Foreign Application Priority Data

Oct. 5, 2012 (FR) ..................................... 12 02676

(51) Int. Cl.
*B64D 45/00* (2006.01)
*G06T 19/00* (2011.01)
*G01C 23/00* (2006.01)

(52) U.S. Cl.
CPC ............. *B64D 45/00* (2013.01); *G01C 23/00* (2013.01); *G06T 19/006* (2013.01)

(58) Field of Classification Search
None
See application file for complete search history.

(56) References Cited

U.S. PATENT DOCUMENTS

| 5,179,638 | A | * | 1/1993 | Dawson et al. | ............. | 345/582 |
| 5,296,854 | A | * | 3/1994 | Hamilton et al. | ................ | 345/9 |
| 5,519,392 | A | * | 5/1996 | Oder | ...................... | G01C 21/22 |
| | | | | | | 701/454 |
| 6,691,004 | B2 | * | 2/2004 | Johnson | ................. | G01C 23/00 |
| | | | | | | 701/14 |
| 7,098,809 | B2 | * | 8/2006 | Feyereisen | ............. | G01C 23/00 |
| | | | | | | 340/963 |
| 2003/0195672 | A1 | * | 10/2003 | He | .................................. | 701/3 |
| 2007/0002078 | A1 | * | 1/2007 | He et al. | ....................... | 345/633 |

(Continued)

OTHER PUBLICATIONS

Peter J. Bennett, Enhanced Navigation and Displays from Passive Terrain Referenced Avionics, 1988, IEEE, pp. 209-216.*

(Continued)

*Primary Examiner* — John Olszewski
*Assistant Examiner* — David P. Merlino
(74) *Attorney, Agent, or Firm* — Davidson, Davidson & Kappel, LLC

(57) ABSTRACT

The vision system for an aircraft according to the invention comprises a display management system, on a display, capable of dynamically displaying synthetic information coming from a synthetic environment generating assembly on the display. The management assembly can control the display, on a first region of the display, of relief lines representative of the terrain situated facing the aircraft, without displaying synthetic surface representations of the terrain in the intermediate areas situated between the relief lines of the first region of the display. The generating assembly includes means for determining the position of the crest lines of the terrain from topographical data present in at least one database, and means for computing the position of the relief lines from the position of the crest lines of the terrain.

1 Claim, 3 Drawing Sheets

(56) References Cited

U.S. PATENT DOCUMENTS

2007/0174005 A1* 7/2007 Bitar .................. G01C 23/005
701/3

OTHER PUBLICATIONS

Corwin, et al."Synthetic Terrain Imagery for Helmet-Mounted Display," (Nov. 15, 1994), vol. 1., retrieved from URL:http://oai.dtic.mil.oai/oai?verb=getrecord&metadataprefix=html&identifier=ADA293612.
Moller, et al. "Synthetic Vision for Enhancing Poor Visibility Flight Operations," IEEE Aerospace and Electronic Systems Magazine, IEEE Service Center, Piscataway, NJ (US), vol. 9, No. 3 (Mar. 2003), pp. 27-33.
Theunissen, Erik, et al.,"Computer Graphics in the Cockpit," Information Design Journal (2002).
Search Report for French Application No. FR 12 02676, dated May 31, 2013.

* cited by examiner

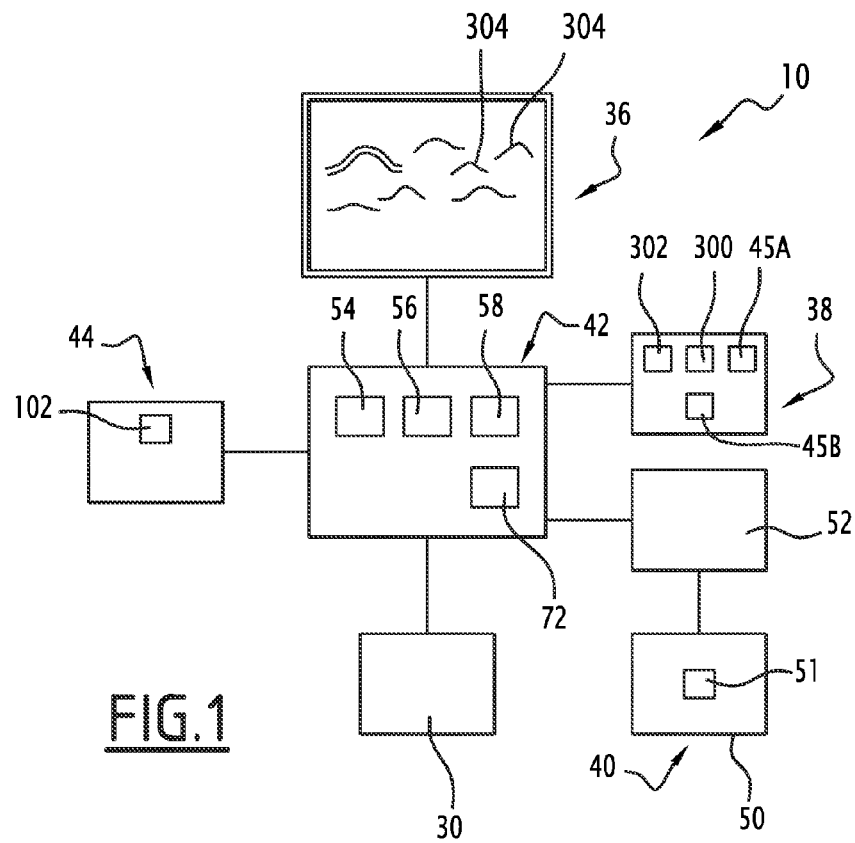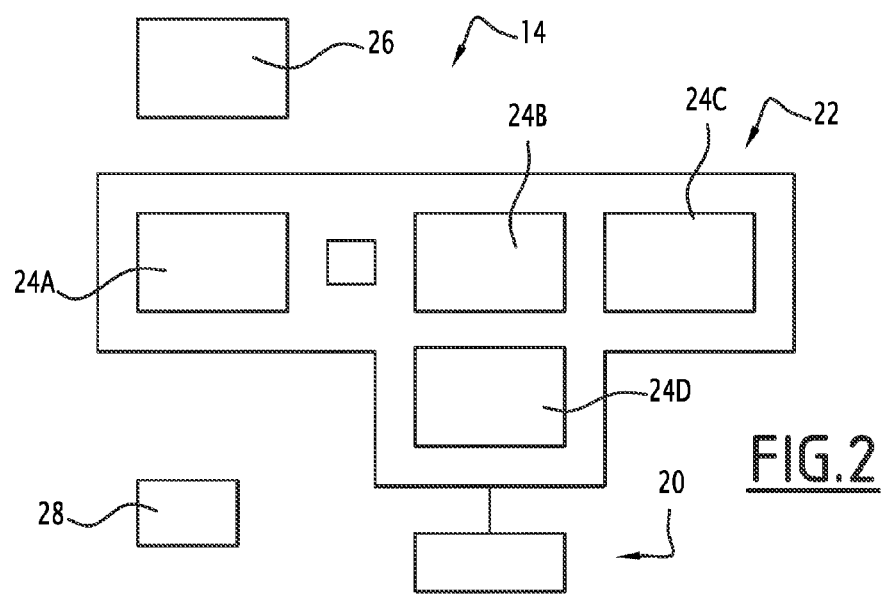

AIRCRAFT VISION SYSTEM WITH RELIEF LINES AND ASSOCIATED METHOD

CROSS-REFERENCE TO RELATED APPLICATIONS

This application claims benefit of French patent application serial number FR 12 02676, filed Oct. 5, 2012, which is herein incorporated by reference.

BACKGROUND OF THE INVENTION

Field of the Invention

The present invention relates to a vision system for an aircraft, comprising:
a display;
an assembly for generating a synthetic environment, the generating assembly including a database, containing at least topographical information relative to the terrain situated facing the aircraft;
a display management system, on the display, capable of dynamically displaying synthetic information coming from the generating assembly on the display.

Description of the Related Art

Such a system is designed to be installed in the cockpit of an aircraft to be associated with a display of the cockpit. The display is for example an at least partially transparent display, such as a semitransparent screen placed in front of the windshield of the cockpit, a system for projecting images on the windshield of the cockpit, a semitransparent sunshade, a helmet visor, or semitransparent glasses close to the eye.

Alternatively, the display is a head-down screen integrated into the dashboard of the cockpit.

To facilitate piloting the aircraft, and to give the pilot overall information on the structure of the terrain situated facing the aircraft, it is known to generate synthetic images of the countryside situated in front of the aircraft, in particular from topographical databases, based on the current position of the aircraft determined by the aircraft's navigation system.

The synthetic images are representative of the environment situated in front of the airplane, as it may be observed through the windshield by a pilot in the cockpit. These synthetic images generally comprise a synthetic surface representation of the terrain.

These images substantially fill the entire screen.

Such a vision system allows the pilot to visualize the relief that may be located in front of the aircraft, in particular when visibility is low or nonexistent.

Such vision systems provide substantial assistance to pilots, but are sometimes inaccurate, in light of possible errors in the positioning of the aircraft and/or in the topographical data available in the databases. It is therefore necessary to have, in parallel, a real vision of the environment located outside the aircraft.

To that end, enhanced vision systems (EVS) have been developed.

These systems generally comprise a camera placed onboard in the bay of the aircraft. The camera, which for example includes sensors operating in the infrared, improves the visibility in front of the aircraft, by detecting the terrain and all structures present on the terrain, for example such as lights present on the runway or around the runway, in particular approach ramp lights.

Based on the image data collected by the camera, a real image of the environment present in front of the aircraft is obtained.

Such vision systems therefore make it possible to confirm the position of the runway relative to the aircraft and/or relative to the environment, and facilitate the pilot's decision when he reaches the decision altitude, at which he must choose whether or not to continue landing.

Hybrid vision systems have also been developed. These systems display both a first region comprising a completely synthetic image, and a second region comprising a real image obtained from an enhanced vision system comprising an infrared camera.

The existing vision systems are effective, but have some drawbacks. Thus, when a synthetic image occupies the screen partially or completely, it sometimes conceals the actual details of the terrain situated behind the image, in particular when the visibility in front of the aircraft is good.

Likewise, in devices making it possible to display a real image, obtained from a camera, the type of image obtained may not be clear enough for the pilot, and may lead to concealing certain important details from the pilot, in particular in terms of the relief.

SUMMARY OF THE INVENTION

One aim of the invention is therefore to obtain a vision system that improves the analysis of the terrain presented to the pilot through the system, without concealing significant details of the terrain.

To that end, the invention relates to a system of the aforementioned type, characterized in that the management assembly is capable of commanding the display, on at least one first region of the display, of relief lines representative of the terrain situated facing the aircraft, without displaying synthetic surface representations of the terrain in the intermediate areas situated between the relief lines of the first region of the display,
the generating assembly comprising means for determining the position of the crest lines of the terrain from topographical data present in at least one database, and means for computing the position of the relief lines from the position of the crest lines of the terrain, and based on the position of the aircraft.

The system according to the invention may comprise one or more of the following features, considered alone or according to any technically possible combination:
the generating assembly is configured so that the width of each relief line displayed on the display is smaller than the length of the relief line, advantageously smaller than 0.1 times the length of the relief line;
the generating assembly is configured so that the total surface area occupied by the relief lines on the display is less than 20%, preferably less than 10% of the surface of the display;
the computation means include means for selecting part of the crest lines from among all of the determined crest lines, the computation means being capable of determining the position of the relief lines from the crest lines selected by the selecting means;
the relief lines displayed by the management assembly are disjointed;
the generating assembly is capable of maintaining the intermediate areas between the relief lines displayed without a synthetic or real image;
it comprises an assembly for generating real images of the terrain situated facing the aircraft, comprising at least one detection sensor, the management assembly being capable of commanding the display, at least in the intermediate areas between the relief lines, of a real image of the terrain situated facing the aircraft, simultaneously with the display of the relief lines;

the display is an at least partially transparent display, such as a semitransparent screen placed in front of the windshield of the cockpit, a system for projecting images on the windshield of the cockpit, a semitransparent sunshade, a helmet visor or semitransparent glasses close to the eye;

it includes a member for adjusting the opaqueness of the display, advantageously situated on a control lever of the aircraft, such as the control stick or the throttle;

the display forms a head-down screen.

The invention also relates to a viewing method for an aircraft, comprising the following steps:

providing a system as described above;

dynamically defining, from the database of the generating assembly, relief lines representative of the terrain situated facing the aircraft;

dynamically displaying, using the management assembly, relief lines on at least one first region of the display without displaying a synthetic surface representation of the terrain in the intermediate areas situated between the relief lines in the first region.

The method according to the invention may comprise one or more of the following features, considered alone or according to any technically possible combination:

the management assembly is capable of maintaining the intermediate areas between the relief lines without a synthetic or real image;

the display is at least partially transparent, the terrain facing the aircraft being observable through the display in the intermediate areas;

a step for acquiring real image data of the terrain situated facing the aircraft by a real image generating assembly, then a step for dynamically generating a real image of the terrain from the image data taken by the real image generating assembly, the method including the display, by the management assembly, of a real image obtained from the real image generating assembly at least in the intermediate areas between the relief lines.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention will be better understood upon reading the following description, provided solely as an example, and done in reference to the appended drawings, in which:

FIG. 1 is a diagrammatic view of a vision system of an aircraft according to the invention;

FIG. 2 is a diagrammatic view of a cockpit in which the vision system is implemented;

DETAILED DESCRIPTION

A first vision system 10 for an aircraft 12 according to the invention is diagrammatically illustrated by FIG. 1.

Figure 5:
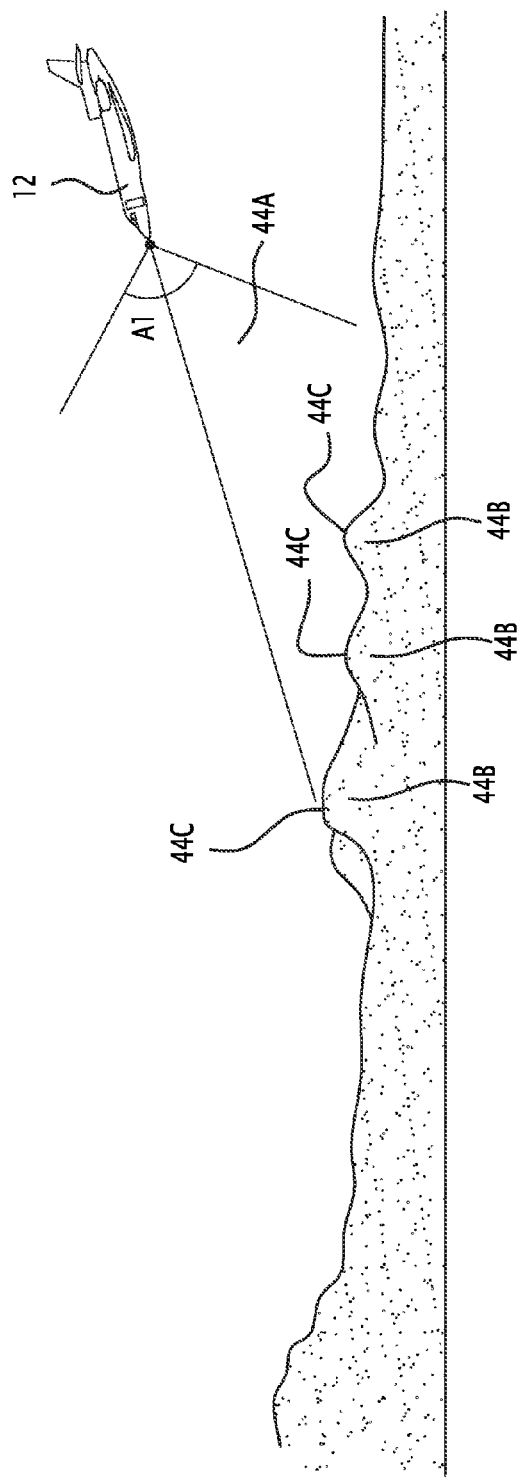
FIG. 5 is a view of the aircraft in a configuration moving above the terrain.

The system 10 is designed to be mounted in an aircraft 12 diagrammatically shown in FIG. 5, to allow the display of information on the display present in the cockpit 14 of the aircraft, diagrammatically shown in FIG. 2.

The system 10 is designed to assist the pilot of the aircraft by depicting the terrain 16 situated facing the aircraft 12 during cruise or during an approach phase, near a runway.

In reference to FIG. 2, the cockpit 14 is provided with a primary display system 22 connected to a central avionics unit 20.

The primary system 22 allows the crew to pilot the aircraft, manage its navigation, and monitor and control the various functional systems present in the aircraft. The system 22 includes a dashboard provided with a plurality of base screens 24A to 24D forming head-down displays.

In this example, the cockpit 14 is also advantageously provided with a semitransparent head-up display 26, placed facing the windshield.

The cockpit 14 is also provided with a control member 28 for piloting the aircraft, such as a lever or control stick.

In a known manner, the base screens 24A and 24C are for example primary display screens designed to display flight parameters of the aircraft. The base screens 24B and 24D are for example multifunctional navigation and/or monitoring and control screens of the avionics systems.

The primary display system 22 is provided with a display management assembly (not shown) capable of displaying the different windows present on the screens 24A to 24D.

The central avionics unit 20 is connected to a measurement and spatial positioning system 30 of the aircraft 12.

The measuring and positioning system 30 for example includes sensors measuring parameters outside the aircraft such as the temperature, pressure or speed, sensors measuring parameters inside the aircraft and its various functional systems, and positioning sensors, such as GPS sensors, inertial navigation units and/or an altimeter.

The positioning sensors are capable of providing information on the geographical position of the aircraft, its speed, its heading and its attitude (pitch attitude, roll angle).

In reference to FIG. 1, the vision system 10 according to the invention is connected to the measurement and positioning system 30.

The vision system 10 includes at least one display 36, an assembly 38 for generating a synthetic environment, and advantageously, an assembly 40 for generating real images.

It also includes a management assembly 42 of the graphic interface of the display 36 connected to each of the assemblies 38, 40 and the positioning system 30.

The system 10 further includes a man-machine interface 44 for adjusting the parameters of the display on the display 36.

The display 36 is for example one of the screens 24A to 24B and/or is the semitransparent head-up display 26 of the cockpit 14. In other alternatives, the display 36 is for example a system for projecting images on the windshield of the cockpit, a semitransparent sunshade, a helmet visor or semitransparent glasses close to the eye.

In a first embodiment that will be described hereafter, the display 36 of the vision system 10 according to the invention is the semitransparent head-up display 26 of the cockpit 14.

In that case, the display 36 can be made partially transparent to allow viewing of the environment situated in front of the display 36, transparently. The display 36 can be made at least partially opaque by displaying a synthetic environment or real images generated by one of the generating assemblies 38, 40, and provided by the management assembly 42, as will be described below.

Figure 6:
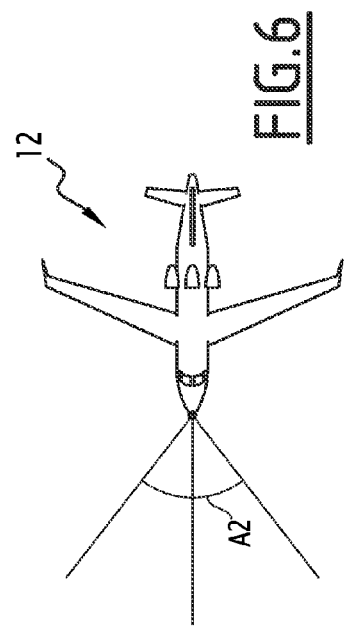
FIG. 6 is a top view of the aircraft during travel.

The dimensions of the display 36 correspond to an observation volume 44A in the space situated in front of the aircraft 12, defined substantially by a pyramid. In reference to FIG. 5 and FIG. 6, the observation volume 44A has a vertical opening angle, along a vertical axial plane of the aircraft 12, equal to A1 and a horizontal opening angle equal to A2 in a horizontal axial plane of the aircraft 12 in a reference related to the aircraft 12.

The opening angle A1 is defined while excluding the regions of the terrain 16 that are not visible by the pilot due to the structure of the cockpit and the pitch attitude of the aircraft 12.

The assembly 38 for generating a synthetic environment is connected to the positioning system 30 and the management assembly 42. It includes a memory and a processor.

It includes at least one database 45A contained in the memory comprising topographical data associated with the terrain above and in front of which the aircraft 12 is moving.

It further includes a model 45B for generating terrain lines, capable of dynamically creating synthetic lines representative of the terrain situated facing and in front of the aircraft, based on the current geographical position of the aircraft 12, and its attitude (in particular heading, pitch attitude, pitch angle, yaw), as determined using the positioning system 30 and based on the topographical data coming from at least one of the databases 45A.

To that end, the generating assembly 38 advantageously includes one or more databases 45A chosen from among terrain, obstacle, navigation, geopolitical, airspace usage, and terrain type (expanses and streams of water, land areas, etc.) databases.

The module 45B is thus capable of creating, at any given moment, a plurality of lines that correspond to discrete elements of the environment that could be observed by the pilot through the windshield at that given moment, when the aircraft is in a given geographical position and attitude.

The synthetic lines can be placed in the observation volume 44A defined by the dimensions of the display 36.

In reference to FIG. 5, the synthetic lines in particular depict the relief lines of protruding elements 44B of the terrain present in front of the aircraft.

The synthetic lines may also advantageously depict aeronautic data such as airports and their landing runways and/or geographical references such as towns or expanses of water (rivers, lakes, seas).

To that end, the generating assembly 38 includes first means 300 for computing the topographical position of the relief lines, from databases 45A, and second means 302 for computing the displayed position of the relief lines 304 on the display 36 to correspond to a vision the pilot would have from the cockpit 14.

The first computation means 300 comprise means for analyzing the databases 45A to determine, based on the given position of the aircraft 12 determined at each moment by the positioning system 30, the topographical position of the significant relief lines on the terrain 16 facing the aircraft in the observation volume 44A.

The significant terrain lines are for example chosen from among the crest lines 44C, advantageously the upper portions of the crest lines 44C.

A crest line 44C is for example defined as a line of upper points of the relief separating two opposite banks of the relief.

The upper point lines may be determined from the topography of the terrain defined in the databases 45A using known algorithms.

Preferably, the first computation means 300 comprise means for selecting part of the computed crest lines 44C to form the relief lines. For example, only the sizing crest lines 44C are selected by the computation means 300. These sizing crest lines are for example the closest and highest apices of the pilot's field of vision.

One example embodiment of the determination of sizing crest lines consists of performing a surface classification of the terrain into categories (for example: wells, channels, passes, crests, peaks, and flat regions), then forming a skeleton of the relief to go from solid surfaces to contours.

The crests are then filtered to keep only the segments that are as continuous as possible. The terrain model thus obtained is projected in the pilot reference, keeping only the crests present in the observation volume 44A.

One example of a method is described in the document "The Geomorphological Characterization of Digital Elevation Models", PhD Thesis, University Of Leicester, UK, 1996, by Jo Wood, and is implemented in the "LandSerf" software.

The extent and position of each relief line 304 is for example developed from the computed position of a crest line 44C, partially or completely using that position, for example using the upper portion of the crest line 44C determined from its apex.

The relief lines 304 are for example chosen to be at least partially disjointed. They each have a first end and a second end situated separated from the first end.

The second computation means 302 are capable of determining, for topographical data of the topographical relief lines determined by the first computation means 300, the position on the display 36 of the relief lines 304 designed to be displayed on that display 36.

They are configured so that the width of the displayed relief lines 304 is advantageously less than 0.1 times the length of said displayed relief lines 304, so as not to clutter the view offered to the pilot. Thus, a skeleton representation of the relief lines 304 is obtained.

In one alternative, the width and/or the brightness of each relief line 304 depends on the distance of the aircraft 12 and the relief line 304. Thus, the relief lines 304 closest to the aircraft 12 have a larger width than the relief lines 34 furthest from the aircraft 12.

Furthermore, the second computation means 302 are configured so that the total surface occupied by the relief lines 304 on the display 36 is less than 20%, preferably less than 10% of the surface area of the display 36.

In the example illustrated in FIG. 1, the aircraft 10 further includes an assembly 40 for generating real images in front of the aircraft.

This generating assembly 40 includes at least one optical measuring sensor 50, such as a camera 51, and a module 52 for generating real images connected to the sensor 50.

Alternatively, the assembly 42 includes a plurality of sensors 50 operating at different wavelengths.

The sensor 50 is for example a visible or infrared camera or a camera in the millimetric domain that is mounted on or near the nose cone of the aircraft 12.

The assembly 40 for generating real images is calibrated to observe the space situated in front of the aircraft in a viewing field preferably corresponding to the observation volume 44A. It is capable of measuring and dynamically providing the module 52 with periodic image data observed at a given resolution in its viewing field.

The module 52 is capable of dynamically processing the periodic data received from the or each sensor 50 to form a real image at each moment, obtained from image data detected by the or each sensor 50, to be displayed on the display 36.

The assembly 42 for managing the interface for example includes a processor 54 and a memory 56. It includes means 58 for managing the display on the display 36.

The display management assembly 42 is connected to the generating assembly 38 and the positioning system 20.

According to the invention, it is capable of dynamically displaying, on at least one first region of the display 36, relief lines 304 representative of the terrain situated facing the aircraft 12, without displaying a synthetic surface representation of the terrain 16, between the relief lines 304.

In particular, the management assembly 42 is capable of maintaining the intermediate areas 306 between the relief lines 304 with no synthetic surface representation of the terrain 16, created from a topographical database.

Figure 3:
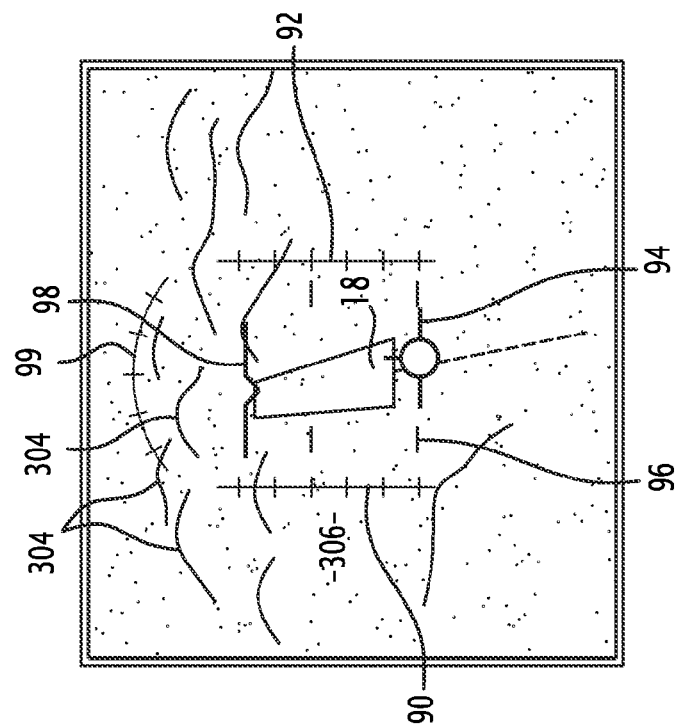
FIG. 3 is a view of a display of the system of FIG. 1, in a first display configuration in which the relief lines are shown, without an intermediate image between the lines.

In a first embodiment, illustrated by FIG. 3, the management assembly 42 is capable of maintaining the intermediate areas 306 without any real image. The pilot can then transparently observe, through the display 36, the space situated in front of the areas 306.

Figure 4:
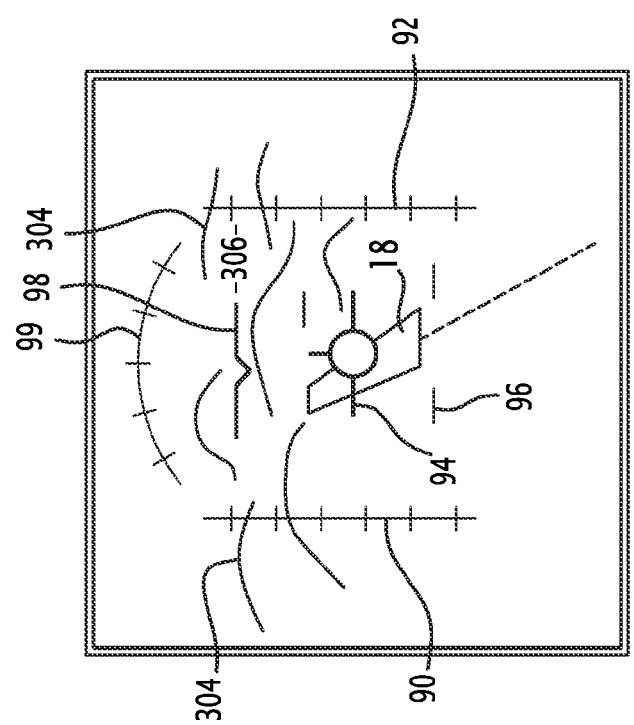
FIG. 4 is a view similar to FIG. 3, in another display configuration, in which the relief lines are displayed, and a real image is displayed between the intermediate lines.

In one alternative shown in FIG. 4, the management means 58 are capable of dynamically displaying a real image, obtained from the real image generating assembly 40, in at least part of the intermediate areas 306, advantageously in all of the intermediate areas 306.

In that case, the intermediate areas 306 are filled in by the real image obtained using the real image generating assembly 40.

The relief lines 304 then mark the reliefs present on the real image, to allow improved observation of those reliefs.

Preferably, the relief lines 304 are then displayed superimposed on the real image.

Advantageously, the management assembly 42 further includes means 72 for controlling the display of symbols representative of flight parameters, superimposed on the display 36.

The control means 72 are for example capable of displaying alphanumeric information, analog information such as scales and/or controls to be actuated by the user.

The symbols are for example representative of at least one of the following parameters: altitude indicator, horizontal situation indicator, airspeed, altitude, vertical speed, corrected airspeed, engine information, lift configuration of the aircraft, etc.

In the example illustrated in FIG. 3, the control means 72 are capable of displaying, on the display 36, independently of the position of the lines 304, a speed scale 90, an altitude scale 92, a symbol 94 or model representing the position of the aircraft 12 and its pitch attitude, a pitch attitude scale 96, a zero pitch attitude indicator 98, and a heading indicator 99.

The man-machine interface 44 includes a member 102 for adjusting the brightness of the display of the relief lines 304, and optionally the brightness of the real image displayed on the display 36.

The adjusting member 102 is capable of adjusting the opaqueness of the lines 304 and/or the real image displayed on the display. This control is for example a button or knob present on the dashboard of the cockpit 14 or mounted on the flight control member 28, serving to maneuver the aircraft 12.

A first viewing method according to the invention will now be described in light of FIGS. 1 to 4.

Initially, when the system 10 is activated, the dimensions of the display 36 correspond to the observation volume 44A in the space situated in front of the aircraft 12, previously defined.

At each update moment T of the display of the system 10, for example at a frequency above 5 Hz and comprised between 5 Hz and 60 Hz, the generating assembly 38 determines the position of the relief lines 304 on the display 36 as a function of the current position of the aircraft 12.

To that end, the first computation means 300 read the current position of the aircraft 12 from the positioning system 30. They determine, from topographical data present in the database is 45A, the topographical databases of the terrain 16 situated in the observation volume 44A situated in front of the aircraft 12 and designed to be shown on the display 36.

Then, in this observation volume 44A, the computation means 300 determine the relevant topographical relief lines designed to be displayed in the form of relief lines 304 on the screen.

The computation means 300 for example determine the crest lines 44C separating the opposite banks of each relief 44B present on the terrain 16.

Then, the computation means 300 determine the topographical relief lines by selecting the sizing crest lines, then extracting, from the computed crest lines, the position of at least one upper part of those crest lines 44C, or re-computing the relief lines from the crest lines 44C.

Next, the second computation means 302 convert the topographical position of the relief lines chosen on the terrain 16 into a relief line position 304 on the display 36, corresponding to a visual representation of the terrain 16 that could be observed by the pilot through the windshield of the cockpit 14.

As seen above, the computation means 302 are configured so that the width of the relief line 304 on the display 36 is smaller than its length, and is in particular less than 0.1 times its length.

Likewise, the computation means 302 are configured so that the relief lines 304 occupy less than 20%, preferably less than 10%, of the display region of the display 36.

The management assembly 42 then displays, at each moment, the relief lines 304 on the display 36.

In a first embodiment, the management assembly 42 maintains the intermediate areas 306 situated between the relief lines 304 with no synthetic surface representation of the terrain or real image. No synthetic surface filling, representative of a terrain or landscape, is thus present between the relief lines 304.

The terrain 16 present in front of the aircraft is thus only discreetly sketched, using individual lines 304 separated by intermediate areas 306 with no synthetic surface representation of the terrain.

When the display 36 is a head-up display that is at least partially transparent, the pilot is thus able to observe, transparently through the display 36, the environment situated in front of the display 36, between the relief lines 304.

In the case where visibility in front of the aircraft 12 is imperfect, or even poor, the relief lines 304 thus displayed on the display 36 emphasize the presence of reliefs and therefore offer improved identification for the pilot, who can anticipate certain relief elements.

Simultaneously, the means 72 for controlling the display of symbols representative of flight parameters display those flight parameters superimposed with the relief lines displayed by the management means 58.

In a second embodiment illustrated in FIG. 4, the management assembly 42 displays, simultaneously with the relief lines 304, a real image obtained from image data received from the real image generating assembly 40. The real image therefore appears in the intermediate areas 306 between the relief lines 304.

Advantageously, the relief lines 304 are superimposed on the real image.

To that end, the real image generating assembly 40 takes, at each moment T, image data in front of the aircraft 12, representative of the environment situated in front of said aircraft 12.

Then, this image data is transferred to the module 52 to be converted into a real image. The management assembly 42 then displays a real image obtained in at least part of the intermediate areas 306, which appears visible between the relief lines 304.

The relief lines 304 thus added to the real image emphasize the relief elements present on the real image, to assist the pilot in interpreting data present on the real image. Thus, the real image supplied by the assembly 40 is enriched by the presence of the relief lines 304 displayed simultaneously.

The presence of these lines 304 therefore provides mutual enrichment of the images, without the pilot losing any information, since the details present on the real image are completely observable.

In the examples depicted in FIGS. 3 and 4, the first region occupies the entire display 36. Alternatively, the first display region of the relief lines 304 occupies only part of the display 36, another region of the display being occupied by a synthetic image comprising at least one synthetic surface representation of the terrain 16.

While the foregoing is directed to embodiments of the present invention, other and further embodiments of the invention may be devised without departing from the basic scope thereof, and the scope thereof is determined by the claims that follow.

The invention claimed is:

1. A vision system for an aircraft, comprising:
   a display;
   a synthetic environment generator for generating a synthetic environment, the synthetic environment generator including at least one database, containing at least topographical information relative to a terrain situated in front of the aircraft;
   a display manager configured to dynamically display synthetic information coming from the synthetic environment generator on the display;
   the display manager being configured to command the display, on at least one first region of the display, of relief lines representative of the terrain situated in front of the aircraft, without displaying synthetic surface representations of the terrain in intermediate areas situated between the relief lines of the first region of the display,
   the synthetic environment generator comprising a crest line position determiner for determining the position of the crest lines of the terrain from topographical data present in at least one database, and a position computer for computing the position of the relief lines from the position of the crest lines of the terrain, and from the position of the aircraft,
   the relief lines displayed by the display manager being disjointed from other relief lines, each relief line having a first end, a second end separated from the first end and being without intersection with any other relief line.

* * * * *